United States Patent
Medawar et al.

[15] 3,655,133
[45] Apr. 11, 1972

[54] THRUST CONTROLLING APPARATUS

[72] Inventors: George E. Medawar, San Diego; Duane L. Linderman, Chula Vista; Ralph O. Brannon, La Mesa, all of Calif.

[73] Assignee: Rohr Corporation, Chula Vista, Calif.

[22] Filed: June 5, 1970

[21] Appl. No.: 43,861

[52] U.S. Cl. ..................239/265.31, 239/265.39, 60/230, 244/110 B
[51] Int. Cl. ........................................B64c 15/06
[58] Field of Search ..................239/265.27, 265.29, 265.31, 239/265.39; 244/110 B, 113; 60/229, 230

[56] References Cited

UNITED STATES PATENTS

| | | | |
|---|---|---|---|
| 2,637,164 | 5/1953 | Robson et al. | 244/110.3 X |
| 3,286,930 | 11/1966 | Petrie | 239/265.27 |
| 2,944,394 | 7/1960 | Peregrine | 239/265.29 |
| 2,944,395 | 7/1960 | Doak | 239/265.29 |
| 3,172,256 | 3/1965 | Kerry et al. | 60/229 |
| 3,273,339 | 9/1966 | Borysthen-Tkacz | 60/229 |

Primary Examiner—M. Henson Wood, Jr.
Assistant Examiner—Michael Y. Mar
Attorney—George E. Pearson

[57] ABSTRACT

Apparatus comprises elongate shroud surrounding jet engine. Aft portion of shroud extends rearward beyond exit end of jet nozzle to surround and control exhaust gas stream. Passages through shroud wall aft of nozzle exit provide flow paths for entry of ambient air to constitute a thrust reverser or thrust modulation system. Blocker doors, generally triangular in planform, are stowed against inner wall of aft portion and deploy to converge forward and form cone shaped body blocking rearward flow of the exhaust gas stream. Apex of the blocker doors is well ahead of passages to divert gas outwardly and rearwardly to passages and through them to produce reverse or modulated thrust. External deflector doors produce a forward component in exiting stream, or scoop in air for ejector action when blocker doors are stowed. Blocker doors translate and rotate forward to deployed position and rearward to stowed position out of registry with deflectors doors. Latter are movable differentially independently of blocker doors to modify pitching moment contribution. Apparatus may be used with conventional jet or fan jet engines.

8 Claims, 5 Drawing Figures

INVENTORS
GEORGE E. MEDAWAR
DUANE L. LINDERMAN
RALPH O. BRANNON
BY George E. Pearson
ATTORNEY

INVENTORS
GEORGE E. MEDAWAR
DUANE L. LINDERMAN
RALPH O. BRANNON

BY *George E. Pearson*
ATTORNEY 3,655,133

THRUST CONTROLLING APPARATUS

BACKGROUND OF THE INVENTION which increases

This invention lies in the field of gas turbine engines, which produce reaction thrust by ejecting a high velocity stream of gas from the exhaust nozzle or tail pipe of the gas turbine. Jet airplanes have very high landing speeds along with residual thrust from the engines. This places an excessive burden on the wheel brakes unless some retarding means is provided to assist in deceleration. In addition, the operation of military airplanes in steep dives or carriers landing approaches requires a high degree of speed braking in flight, frequently followed by a need for immediate full power application. Analysis has shown that the system may also be used to advantage in tactical "dog fight" situations.

The invention is directed to apparatus whichincreases mass flow by mixing free stream air with the gas stream and an apparatus which reverses the direction of exhaust gas flow to produce counter thrust, with the capability of pitching moment control and is more particularly directed to combine apparatus which performs all three of these functions. No other scheme has been put into practice which performs these three functions.

SUMMARY OF THE INVENTION

This invention provides a very satisfactory solution to the general problem and offers a combination apparatus consisting of an ejector which induces the free air stream into a mixing zone with the exhaust gas stream, the ejector inlet passages also serving as outlet passages when in the reverse thrust mode. A plurality of blocker doors are provided which may be precisely modulated to positions which block part or all of the exhaust gases and direct the gases forward and out of the ejector ports.

Generally state, in generic form, the apparatus comprises an elongate streamlined shroud connected to and surrounding the engine and may be a nacelle or other portion of the airplane structure. The aft portion of the shroud extends rearwardly beyond the exit end of the nozzle to surround and control the exhaust gas stream. A plurality of air flow passages spaced around the periphery of the shroud aft of the exit end of the nozzle extend through the shroud wall to provide paths for inflow of free stream air during ejector operation and for outflow of the gas stream during reverser operation. A deflector door is pivotally mounted at its aft end in each passage and may be swung outward to enlarge the port area and direct the exhaust gases forward during reverse and modulated thrust modes of operation. These deflector doors may be positioned differentially, with varying angular settings, to provide pitching moment trim capability or to intentionally introduce pitching moment or yawing moments for emergency longitudinal or directional airplane control.

In the presently preferred form a plurality of blocker doors, preferably three, are provided and movably mounted within the aft portion of the shroud. They are generally triangular in planform with an apex at the forward end and a base at the aft end. In addition, each door is generally arcuate in cross section in planes perpendicular to its fore and aft axis to facilitate nesting adjacent to the inner wall of the shroud when in the stowed position. When the forward ends are swung in to the longitudinal axis of the engine, the doors form a cone with the base blocking axial rearward flow of the exhaust gas stream, and the base is just slightly aft of the passages so that the conical surface diverts the gas stream outward and rearward directly to the passages, thus practically eliminating stagnation pockets.

The blocker door bases are slidably and pivotally mounted on axially extending tracks for bodily movement from an aft stowed position out of registry with the passages to a forward deployed position, and lever arms are pivotally connected to the shroud and to the forward ends of the blocker doors to cause them to swing inward during their deploying movement.

Both the blocker doors and the deflector doors may be adjusted to intermediate positions to provide partial thrust reversal and to modulate the forward component of the laterally exiting gas stream to avoid re-ingestion of the gas during low speed operation. The two sets of doors are movable independently of each other to facilitate their dual functions. In addition, the deflector doors may be moved independently of each other and differentially to trim the pitching moment during reverse thrust operation.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
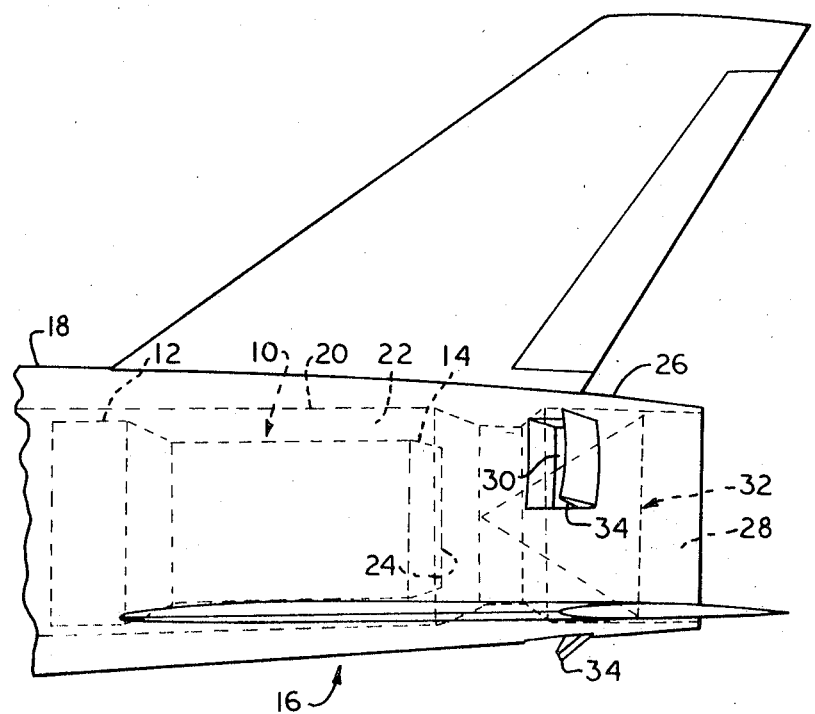
FIG. 1 is a schematic side view of the aft portion of an airplane fuselage housing a jet engine having a shroud incorporating the invention.

The general arrangement schematically illustrated in FIG. 1 shows an embodiment of the invention in its relation to other elements of a typical jet engine installation. The engine 10, having a usual turbine with longitudinal axis of rotation, has an axial flow compressor 12 mounted on it forward end and terminates at its aft end in a nozzle 14, through which are ejected the products of combustion from the engine. A shroud 16 is provided to surround the components of the engine The shroud may be a portion of a nacelle or wing or other aircraft structure but for simplicity is shown as the elongated aft section of a fuselage which is generally annular in cross section and generally coaxial with the engine. The forward portion 18 extends forward or upstream of the compressor to provide a conventional entry passage for the flow of air to the compressor. As shown, the intermediate portion of the shroud is radially spaced from the engine, and a shell 20 within the shroud is also radially spaced from the engine to form a passageway 22. The radially inner portion of the air received from the compressor flows rearwardly into the combustor of the engine while the radially outer portion of the air flows rearward through passageway 22 to be emitted substantially at the exit 24 of the nozzle for mixing with the exhaust gas from the turbine. Thus, the installation is a fan or by-pass type, although the invention is applicable in the same way to a conventional jet engine installation.

Figure 2:
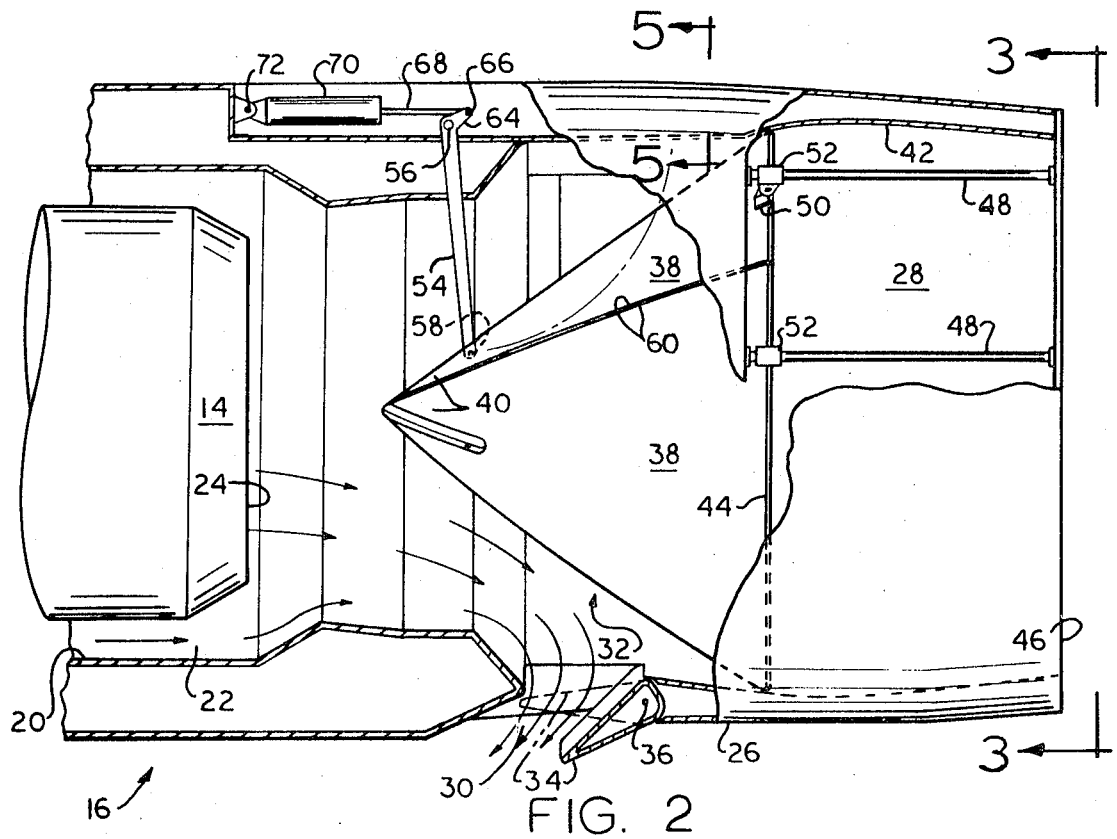
FIG. 2 is an enlarged fragmentary view of FIG. 1, certain parts being broken away and certain parts being shown in section, and showing the aft end of the engine and shroud.

The aft portion 26 of the shroud extends rearward beyond the plane of the exit end 24 of the nozzle to define a mixing zone 28. A plurality of passages 30, preferably three, are formed through the wall of aft portion 26 aft of the lateral plane of exit end 24 of the nozzle and they are preferably equally spaced around the periphery. They extend fully through the wall from the exterior to the interior and provide flow paths for free stream air to enter and join the exhaust gas and fan air in the mixing zone. Thus, portion 26 of the shroud may be considered an ejector ring. In addition the same passages form flow paths for thrust reversing outflow of the jet stream when blocker assembly 32 is deployed as indicated in FIGS. 1 and 2 to prevent the jet stream from flowing axially rearward and diverts it to the passages.

A deflector door 34 is provided for each of the passages and is pivotally connected at its aft end at 36 to the shroud for swinging between the deployed position shown in solid lines and the stowed position shown in broken lines. In the deployed position the deflector doors impart a forward component to the exiting jet stream for thrust reversal, and at other times scoop in free stream air for ejector action.

Figure 3:
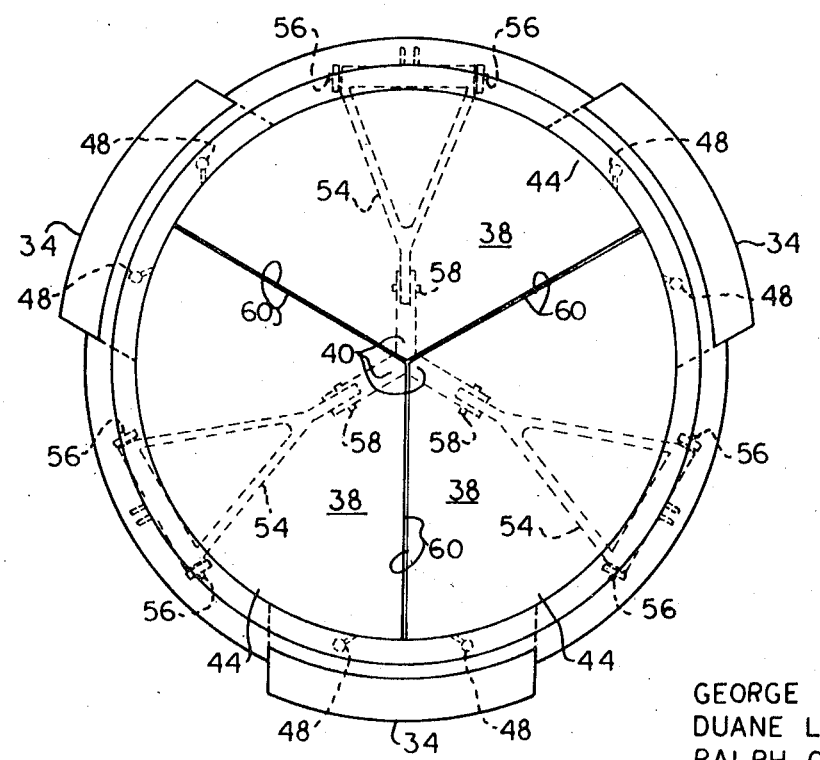
FIG. 3 is a rear end view, as seen along the line 3—3 of FIG. 2.

The blocker assembly 32 preferably comprises three blocker doors 38 which are bodily movable fore and aft, and their forward ends 40 are swingable from the inner wall 42 of the shroud to the longitudinal axis of the engine. Each blocker door, as best indicated in FIG. 3, is generally triangular in planform with an apex at the forward end 40 and with its base 44 located rearward or downstream. The doors are generally arcuate in cross section in planes perpendicular to their fore and aft axes to facilitate nesting with the inner wall 42 of the shroud when they are in stowed position.

When the blocker doors are in stowed position they lie in nested relation with the inner wall of the shroud, and in effect, form a part of the wall of the mixing zone. Their base 44 are then adjacent the shroud exit 46, and their forward apex ends 40 are centered between the passages 30, and extend slightly forwardly of the aft end of these passages. Since the blocker doors are triangular and their forward ends or apices are located between the passages, as can be seen in FIG. 3, they need not be stowed completely aft of the passages to lie out of registry with them.

Figure 4:
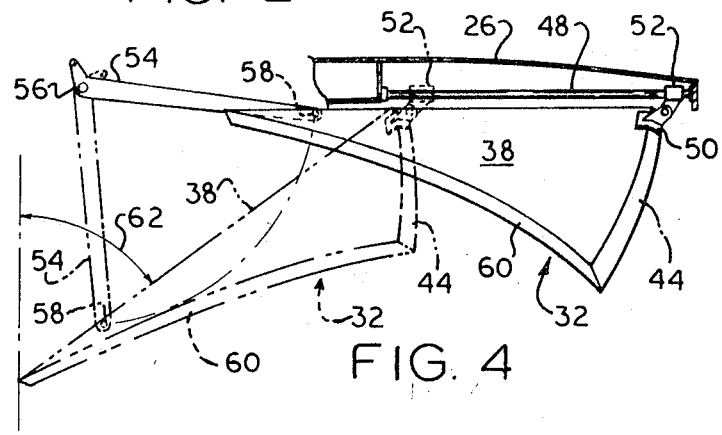
FIG. 4 is a view showing a portion of the shroud in section, and one of the three blocker doors and its mounting mechanism in side elevation, the blocker door being shown in solid lines in stowed position, and in dash-two-dot lines in deployed position.

To accomplish the combined movements of blocker doors 38, a pair of axially extending guide tracks 48 fixedly mounted to the shroud structure is provided for each door, and the base 44 is provided with brackets 50 pivotally connected to track followers 52 which are slidable from end to end of the guide tracks. A lever arm 54 for each door is pivotally connected at its first end to the shroud structure at 56 and pivotally connected at its second end to the forward end 40 of the door by pivot means 58. As indicated best in FIG. 4, during deployment from the solid line position to the broken line position the base 44 is constrained to move axially adjacent to the shroud wall while lever arm 54 causes end 40 of the door to swing until the apex is at the longitudinal axis of the engine.

At this time the side edges 60 of the doors 38 engage each other to form a cone and the bases 44 define a complete circular base extending across the diameter of the shroud to completely block axial rearward flow of the jet stream. The forward movement of doors 38 is sufficient to bring the apex of the cone well forward of the passages 30 and the base of the cone not far behind the passages. In this position, the cone diverts the jet stream outwardly and rearwardly directly to the passages to practically eliminate stagnation pockets and provide a smooth flow reversal as indicated by the arrows in FIG. 2. A steep cone is desirable and the negative sweep angle 62, FIG 4, between the fore and aft axes of the doors and a plane perpendicular to the longitudinal axis of the engine is preferably at least 45 degrees and most preferably about 60°.

Each lever arm 54 is provided with an angularly directed control horn 64 which is pivotally connected at 66 to a force applying link comprising piston rod 68 which is slidable in actuator cylinder 70 pivotally connected at 72 to the shroud structure. Operation of the actuators causes arms 54 to swing through an angle of about 90° to move doors 38 between stowed and deployed positions. The action may be controlled to adjust the doors to any degree of deployment. Thus, when they are in selected intermediate positions the engine may be run at a high throttle setting and some of the jet stream will issue axially rearward and some will issue through passages 30 to produce a high degree of counter thrust to retard the airplane during dives or carrier landings. At the termination of a dive or in the event of a wave-off, the doors are promptly stowed and full forward thrust is available almost instantaneously since the engine is running at or near full rotational speed.

The deflector doors 34 may be operated by any suitable servo means which may be controlled to adjust the doors to any desired angle. This allows control of the amount of ejector action to achieve the most efficient results at various air speeds. It also allows control of the reverse thrust vector to produce varying degrees of retardation and pitch control in flight and also to avoid the possibility of re-ingestion of exhaust gases in the slower phases of the landing run.

Figure 5:
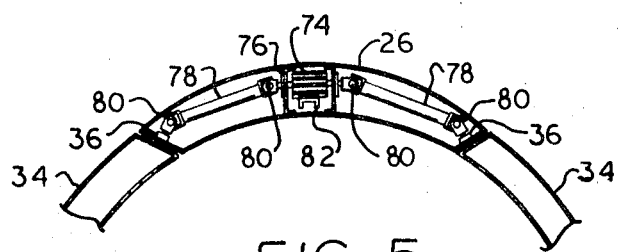
FIG. 5 is a fragmentary sectional view taken on line 5—5 of FIG. 2.

One suitable form of actuating mechanism is illustrated in FIG. 5, where a pinion 74 is rotatably mounted in bracket 76 between the inner and outer shroud walls and is rotatably connected to two of the doors 34 by means of rotatable drive shafts 78 and universal joints 80 to cause all of the elements to rotate in unison. The pinion is rotated by an axially movable rack 82 which may be driven by a hydraulic actuator, not shown, similar to actuator 70. Similar servo means may be located between each two doors so that each servo effectively could operate all three doors. It will be understood that the deflector doors are operable independently of the blocker doors in order to achieve all of the functions described above.

In some cases when this invention is used in an aft fuselage installation on fighter type aircraft, it is desirable to provide for minimizing adverse airplane stability and control influences in the reverse thrust mode. This is done by selective placement of the reverse thrust discharge openings with respect to empennage surfaces and further by judicious selection of deflector door angular positions. For example, when oriented with the upper two deflector ports discharging above and behind the horizontal tail and the lower deflector port discharging downward and behind the horizontal tail, the airplane pitching moment may be directly influenced by differential angular movement of the deflector doors. When the upper deflector doors are closed and the lower deflector door opened, a nose down pitching moment contribution is produced in reverse thrust. Opposite differential movement of the doors will produce a nose-up pitching moment contribution in reverse thrust. This provides a means of trimming the reverse thrust pitching moment to correspond with forward thrust pitching moment, thereby minimizing the trim change requirement associated with thrust control system deployment.

It will be apparent that the invention disclosed herein utilized a relatively small number of simple and reliable components to provide a triple function apparatus which achieves increased mass flow by incorporating ejector operation together with pitching moment trim capability or emergency longitudinal and directional control capability.

Having thus described the invention, what is claimed as new and useful and desired to be secured by U. S. Letters Patent is:

1. Thrust controlling apparatus for use in combination with a jet engine having a rearwardly discharging nozzle adapted to produce reaction thrust, comprising: an elongate shroud of generally annular cross section connected to and surrounding at least a portion of the engine; the aft portion of the shroud extending rearwardly beyond the exit end of the nozzle to surround and control the exhaust gas stream issuing therefrom; a plurality of peripherally spaced passages extending through the wall of said aft portion from the interior to the exterior thereof and aft of the plane of the exit end of the nozzle for outflow of the exhaust gas stream to constitute said aft portion a thrust reverser; a plurality of blocker doors mounted in said aft portion for movement between stowed position lying adjacent to the inner wall of said aft portion and deployed position converging forward to form a cone having a base extending across said aft portion aft of the passages and having an apex substantially on the longitudinal axis of the engine and substantially forward of the passages; said blocker doors in deployed position serving to prevent axial rearward exit of the exhaust gas stream and divert it angularly outwardly and rearwardly to the passages for outflow therethrough in directions transverse to the longitudinal axis of the engine; means in the passages to further divert the laterally exiting stream forwardly at a substantial angle; said means comprising deflector doors pivotally mounted at their aft ends to said aft portion to swing outward to deflecting position and inward to stowed position blocking the flow paths through the passages; and said doors being adjustable to various angular positions to vary the forward component of the exiting stream for various operating conditions.

2. Thrust controlling apparatus for use in combination with a jet engine having a rearwardly discharging nozzle adapted to produce reaction thrust, comprising: an elongate shroud of generally annular cross section connected to and surrounding at least a portion of the engine; the aft portion of the shroud extending rearwardly beyond the exit end of the nozzle to surround and control the exhaust gas stream issuing therefrom; a plurality of peripherally spaced passages extending through the wall of said aft portion from the interior to the exterior thereof and aft of the plane of the exit end of the nozzle for outflow of the exhaust gas stream to constitute said aft portion a thrust reverser; a plurality of blocker doors mounted in said aft portion for movement between stowed position lying adjacent to the inner wall of said aft portion and deployed position converging forward to form a cone having a base extending across said aft portion aft of the passages and having an apex substantially on the longitudinal axis of the engine and substantially forward of the passages, said blocker doors in deployed position serving to prevent axial rearward exit of the exhaust gas stream and divert it angularly outwardly and rearwardly to the passages for outflow therethrough in directions transverse to the longitudinal axis of the engine; each of said blocker doors being generally triangular in planform with an apex at the forward end and a base at the aft end and being generally arcuate in cross section in planes perpendicular to its fore and aft axis to facilitate nesting adjacent to the inner wall of said aft portion in stowed position; the blocker doors being movable from an aft stowed position to a forward deployed position for thrust reversal; first guide means to maintain the base of each door adjacent to the wall of the aft portion during its forward movement; and second guide means to swing the apex of each door inwardly toward the longitudinal axis of the engine during its forward movement to cause the doors to engage each other along their side edges and define said cone; and actuator means to cause deploying and stowing movement of the doors.

3. Apparatus as claimed in claim 2, said first guide means comprising axially extending guide rails and said bases being provided with track followers slidably engaging the guide rails; and said second guide means comprising lever arms pivotally connected at a first end to said aft portion and pivotally connected at the second end to the forward ends of the doors; said lever arms extending substantially axially rearward in stowed position and swingable forward and inward toward the longitudinal axis of the engine to deployed position.

4. Apparatus as claimed in claim 3, said lever arms being provided at their first ends with angularly directed control horns; and said actuator means comprising an actuator for each lever arm having a force applying link connected to its respective control horn.

5. Thrust controlling apparatus for use in combination with a jet engine having a rearwardly discharging nozzle adapted to produce reaction thrust, comprising: an elongate shroud of generally annular cross section connected to and surrounding at least a portion of the engine; the aft portion of the shroud extending rearwardly beyond the exit end of the nozzle to surround and control the exhaust gas stream issuing therefrom; a plurality of peripherally spaced passages extending through the wall of said aft portion from the interior to the exterior thereof and aft of the plane of the exit end of the nozzle for outflow of the exhaust gas stream to constitute said aft portion a thrust reverser; a plurality of blocker doors mounted in said aft portion for movement between stowed position lying adjacent to the inner wall of said aft portion and deployed position converging forward to form a cone having a base extending across said aft portion aft of the passages and having an apex substantially on the longitudinal axis of the engine and substantially forward of the passages; said blocker doors in deployed position serving to prevent axial rearward exit of the exhaust gas stream and divert it angularly outwardly and rearwardly to the passages for outflow therethrough in directions transverse to the longitudinal axis of the engine; each of said blocker doors being generally triangular in planform with an apex at the forward end and a base at the aft end and being generally arcuate in cross section in planes perpendicular to its fore and aft axis to facilitate nesting adjacent to the inner wall of said aft portion in stowed position; the blocker doors being bodily movable from an aft stowed position to a forward deployed position for thrust reversal; the side edges of the blocker doors engaging each other to form said cone; deflector doors in each of said passages pivotally mounted at their aft ends to said aft portion to swing outward to deployed position for deflecting the exiting stream forwardly and to swing inward to stowed position blocking the flow paths through the passages; and the blocker doors in stowed position lying adjacent to the inner wall of said aft portion and out of registry with the passages to permit the deflector doors to be deployed to introduce free stream air and constitute said aft portion an ejector ring.

6. Thrust controlling apparatus for use in combination with a jet engine having a rearwardly discharging nozzle adapted to produce reaction thrust, comprising: an elongate shroud of generally annular cross section connected to and surrounding at least a portion of the engine; the aft portion of the shroud extending rearwardly beyond the exit end of the nozzle to surround and control the exhaust gas stream issuing therefrom; a plurality of peripherally spaced passages extending through the wall of said aft portion from the interior to the exterior thereof and aft of the plane of the exit end of the nozzle for outflow of the exhaust gas stream to constitute said aft portion a thrust reverser; a plurality of blocker doors mounted in said aft portion for movement between stowed position lying adjacent to the inner wall of said aft portion and deployed position converging forward to form a cone having a base extending across said aft portion aft of the passages and having an apex substantially on the longitudinal axis of the engine and substantially forward of the passages; said blocker doors in deployed position serving to prevent axial rearward exit of the exhaust gas stream and divert it angularly outwardly and rearwardly to the passages for outflow therethrough in directions transverse to the longitudinal axis of the engine; each of said blocker doors being generally triangular in planform with an apex at the forward end and a base at the aft end and being generally arcuate in cross section in planes perpendicular to its fore and aft axis to facilitate nesting adjacent to the inner wall of said aft portion in stowed position; the blocker doors being bodily movable from an aft stowed position to a forward deployed position for thrust reversal; the side edges of the blocker doors engaging each other to form said cone; deflector doors in each of said passages pivotally mounted at their aft ends to said aft portion to swing outward to deployed position for deflecting the exiting stream forwardly and to swing inward to stowed position blocking the flow paths through the passages; and the forward apex ends of the blocker doors in stowed position lying between the passages to permit the deflector doors to be deployed to introduce free stream air and constitutes said aft portion an ejector ring.

7. Thrust controlling apparatus for use in combination with a jet engine having a rearwardly discharging nozzle adapted to produce reaction thrust, comprising: an elongate shroud of generally annular cross section connected to and surrounding at least a portion of the engine; the aft portion of the shroud extending rearwardly beyond the exit end of the nozzle to surround and control the exhaust gas stream issuing therefrom; a plurality of peripherally spaced passages extending through the wall of said aft portion from the interior to the exterior thereof and aft of the plane of the exit end of the nozzle for outflow of the exhaust gas stream to constitute said portion a thrust reverser; a plurality of blocker doors mounted in said aft portion for movement between stowed position lying adjacent to the inner wall of said aft portion and deployed position converging forward to form a cone having a base extending across said aft portion aft of the passages and having an apex substantially on the longitudinal axis of the engine and substantially forward of the passages; said blocker doors in deployed position serving to prevent axial rearward exit of the exhaust gas stream and divert it angularly outwardly and rearwardly to the passages for outflow therethrough in directions transverse to the longitudinal axis of the engine; each of said blocker doors being generally triangular in planform with an apex at the forward end and a base at the aft end and being generally arcuate in cross section in planes perpendicular to its fore and aft axis to facilitate nesting adjacent to the inner wall of said aft portion in stowed position; the blocker doors being bodily movable from an aft stowed position to a forward deployed position for thrust reversal; the side edges of the blocker doors engaging each other to form said cone; deflector doors in each of said passages pivotally mounted at their aft ends to said aft portion to swing outward to deployed position for deflecting the exiting stream forwardly and to swing inward to stowed position blocking the flow paths through the passages; said deflector doors being movable independently of the movement of the blocker doors; and said deflector doors further being movable independently of each other to selected differential angular positions for minimizing adverse airplane control and stability by utilizing the exhaust plume effects on empennage surfaces to trim out undesirable moments associated with the thrust control system deployment.

8. Thrust controlling apparatus for use in combination with a jet engine having a rearwardly discharging nozzle adapted to produce reaction thrust, comprising: an elongate shroud of generally annular cross section connected to and surrounding at least a portion of the engine; the aft portion of the shroud extending rearwardly beyond the exit end of the nozzle to surround and control the exhaust gas stream issuing therefrom; a plurality of peripherally spaced passages extending through the wall of said aft portion from the interior to the exterior thereof and aft of the plane of the exit end of the nozzle for outflow of the exhaust gas stream to constitute said aft portion a thrust reverser; a plurality of blocker doors mounted in said aft portion for movement between stowed position lying adjacent to the inner wall of said aft portion and deployed position converging forward to form a cone having a base extending across said aft portion aft of the passages and having an apex substantially on the longitudinal axis of the engine and substantially forward of the passages; said blocker doors in deployed position serving to prevent axial rearward exit of the exhaust gas stream and divert it angularly outwardly and rearwardly to the passages for outflow therethrough in directions transverse to the longitudinal axis of the engine; each of said blocker doors being generally triangular in planform with an apex at the forward end and a base at the aft end and being generally arcuate in cross section in planes perpendicular to its fore and aft axis to facilitate nesting adjacent to the inner wall of said aft portion in stowed position; the blocker doors being bodily movable from an aft stowed position to a forward deployed position for thrust reversal; the side edges of the blocker doors engaging each other to form said cone; deflector doors in each of said passages pivotally mounted at their aft ends to said aft portion to swing outward to deployed position for deflecting the exiting stream forwardly and to swing inward to stowed position blocking the flow paths through the passages; and said blocker doors being adjustable to preselected positions between stowed and deployed position to block portions of the axially rearward emission of the exhaust gas stream and to divert those portions of the stream outward through the passages.

* * * * *